United States Patent [19]

Saar

[11] 4,307,325
[45] Dec. 22, 1981

[54] DIGITAL CONTROL SYSTEM FOR ELECTRIC MOTORS IN POWER TOOLS AND THE LIKE

[75] Inventor: David A. Saar, Timonium, Md.

[73] Assignee: Black & Decker Inc., Newark, Del.

[21] Appl. No.: 133,463

[22] Filed: Mar. 24, 1980

Related U.S. Application Data

[63] Continuation-in-part of Ser. No. 116,258, Jan. 28, 1980, abandoned.

[51] Int. Cl.³ .............................................. H02P 5/16
[52] U.S. Cl. .................................. 318/334; 318/472; 318/345 E
[58] Field of Search .................. 318/345 E, 461, 463, 318/465, 464, 456, 341, 490, 334, 471, 472, 473, 4; 361/240, 242, 25, 27; 364/557; 324/158 MG; 340/588, 589, 648; 73/362 SC

[56] References Cited

U.S. PATENT DOCUMENTS

| | | | |
|---|---|---|---|
| 3,860,861 | 1/1975 | Gucker | 318/473 |
| 4,007,492 | 2/1977 | Rose | 361/342 |
| 4,090,116 | 5/1978 | Lippitt | 318/345 E |
| 4,153,863 | 5/1979 | Schachte et al. | 318/341 |

*Primary Examiner*—David Smith, Jr.
*Attorney, Agent, or Firm*—Harold Weinstein; Walter Ottesen; Edward D. Murphy

[57] ABSTRACT

A digital control system for electric motors in power tools of the portable or stationary type includes a microcomputer controlled speed regulator connected to the electric motor for maintaining a preselected speed of the motor substantially constant between no load and full load operation of the motor. The preselected speed is inputted to the microcomputer by means of a rotary switch or similar input switching arrangement. When the tool is just starting or the operator changes the speed switch, the microcomputer controls the speed of the motor to slowly approach the desired speed. The microcomputer is programmed to detect an overload condition and activate an alarm, and an impending kickback condition and stop the electric motor.

7 Claims, 6 Drawing Figures

DIGITAL CONTROL SYSTEM FOR ELECTRIC MOTORS IN POWER TOOLS AND THE LIKE

CROSS-REFERENCE TO RELATED APPLICATIONS

The present application is a continuation-in-part of application Ser. No. 116,258, filed Jan. 28, 1980, now abandoned.

FIELD OF THE INVENTION

The subject invention generally relates to electric motor control systems, and more particularly to a digital control system for electric motors in power tools or the like. More specifically, the present invention relates to such a control system employing a microcomputer speed regulator for the direct digital firing of thyristors placed between an AC source and the motor of such well known electric motor driven tools as universal motor or AC motor driven drills, saws or the like.

SUMMARY OF THE INVENTION

It is an object of the invention to provide a microcomputer based digital control system for electric motors in power tools and the like.

It is another object of the present invention to provide a digital control system for electric motors employing a microcomputer controlled speed regulator and including speed selecting means connected as an input to the microcomputer for inputting a preselected speed.

It is a further object of this invention to provide a digital control system for electric motors in power tools wherein the control system employs a microcomputer programmed to detect various conditions such as an overload or an impending kickback or the like. Subsequent to the occurrence of the condition, a suitable action may be taken automatically or via signal to the operator for his action.

The foregoing and other objects of the invention are attained by providing a digital control system for electric motors including a microcomputer controlled speed regulator for maintaining a preselected speed of the electric motor substantially constant between no load and full load operation of the motor. Speed selecting means are connected as an input to the microcomputer for inputting the preselected speed. The speed selecting means may be any suitable type such as a rotary switch. The actual speed of the motor is calculated by the microcomputer from the speed signal information derived from a speed sensor device operatively coupled to the motor. The microcomputer is programmed to control the speed of the motor in accordance with the preselected speed value by controlling the conduction angle of a power semiconductor control device which controls the application of power to the motor.

The microcomputer also utilizes the speed signal information from the speed sensor to provide anti-kickback protection for the power tool. More particularly, the microcomputer is programmed to recognize when the rotational speed of the motor is decelerating and to detect when the rate of deceleration exceeds a predetermined rate. In response to the detection of such an occurrence, the microcomputer will automatically cut power to the motor.

In addition, a sophisticated form of overload protection is also provided which warns of an impending overload condition, using solely the speed signal information derived from the speed sensor and the known conduction angle of the semiconductor control device. Accordingly, an incremental cost savings is realized. The overload calculation utilizes a numerical integrator, which in the preferred embodiment comprises a storage register whose contents are periodically updated by adding to or subtracting from the current value a "heating value" which is determined according to the conduction angle (voltage) and measured speed of the motor. The "heating values" assigned to each of the various operating ranges of the motor are empirically determined and stored in matrix form in the microcomputer. Positive "heating values" correspond to a net heat increase and negative values correspond to a net heat loss. Whenever the accumulated total in the storage register exceeds a predetermined value, an overload condition is signalled. Normal operation is resumed when the total drops below a second lower predetermined value.

BRIEF DESCRIPTION OF THE DRAWINGS

The specific nature of the invention, as well as other objects, aspects, uses and advantages thereof, will clearly appear from the following description and from the accompanying drawings in which.

DESCRIPTION OF THE PREFERRED EMBODIMENT

Figure 1:
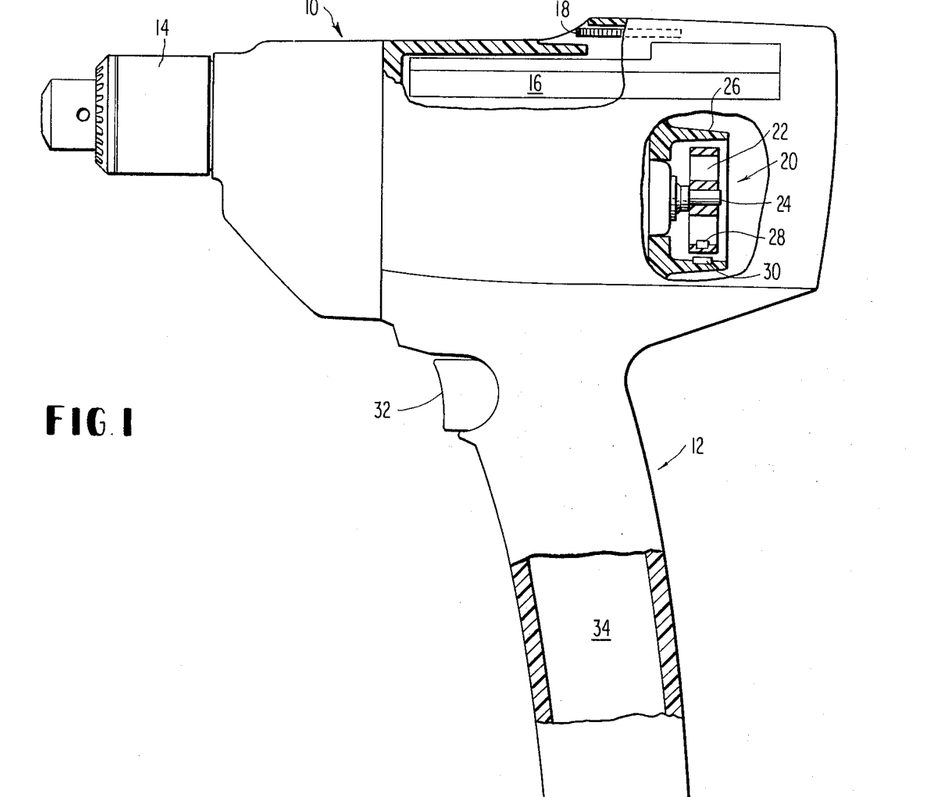
FIG. 1 is a side view, partially in cross-section, of a hand-held power drill illustrating a specific application of the invention.
Figure 2:
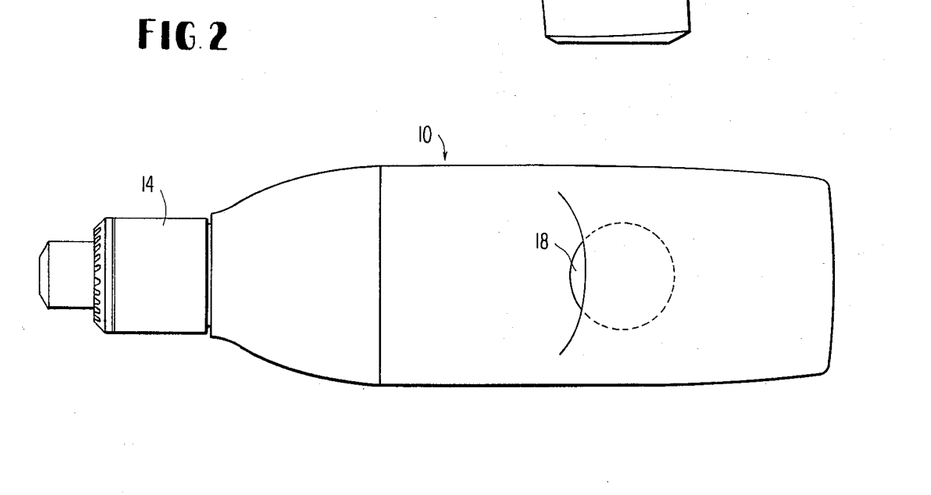
FIG. 2 is a top view of the hand-held power drill shown in FIG. 1.

While the invention has broad general application to control systems for electric motors and particularly electric motor driven power tools, the invention will be described in one preferred embodiment as it is applied to a hand-held power drill. Reference is made to FIGS. 1 and 2 which show side and top views, respectively, of the hand-held power drill. This tool comprises a main body portion 10 and a centrally disposed handle portion 12. The main body portion houses the electric motor and gear reduction unit that drives the drill chuck 14. A cooling fan (not shown) is affixed to the output shaft of the motor to facilitate cooling of the tool. In addition, the main body portion 10 houses the microcomputer in a compartment 16 in the top of the main body portion, and adjacent thereto is the selector dial 18 of the rotary speed selector switch. The selector dial 18 is only partially exposed, the major portion of the dial being within the main body portion of the power drill. Also, the main body portion 10 houses a signal device 20 which outputs a pulse responsive to motor rotation to permit measurement of the speed of the motor. The signal device 20 comprises a plastic member 22 attached to the shaft 24 of the motor. The plastic member 22 rotates with the motor shaft within a protective cup-shaped member 26 and has embedded in a peripheral edge thereof a permanent magnet 28. The cup-shaped member 26 supports a magnetic field detecting device 30, such as a Hall effect sensor, in proximity to the path of the permanent magnet 28. As the magnet 28 passes close to the Hall effect sensor 30, an electric pulse is generated by the sensor so that one pulse is generated for each revolution of the electric motor. The microcomputer program as set forth hereinafter will measure the speed of the motor by measuring the time between these electrical pulses.

The handle portion 12 is provided with a trigger 32 which is used to actuate an on-off switch. In addition, a compartment 34 in the handle portion 12 is used to house the power supply and control circuits. The AC line cord enters the bottom of the handle portion and connects directly with the power supply and control circuits.

At the heart of the digital control system according to the invention is a microcomputer which may be any one of a number of commercially available microcomputers. These are integrated circuit devices containing all of the functions required in a digital computing system. In the embodiment which will be described with reference to FIG. 4, a 3870 microcomputer (available from Mostek, Motorola or Fairchild) is used.

Figure 3:
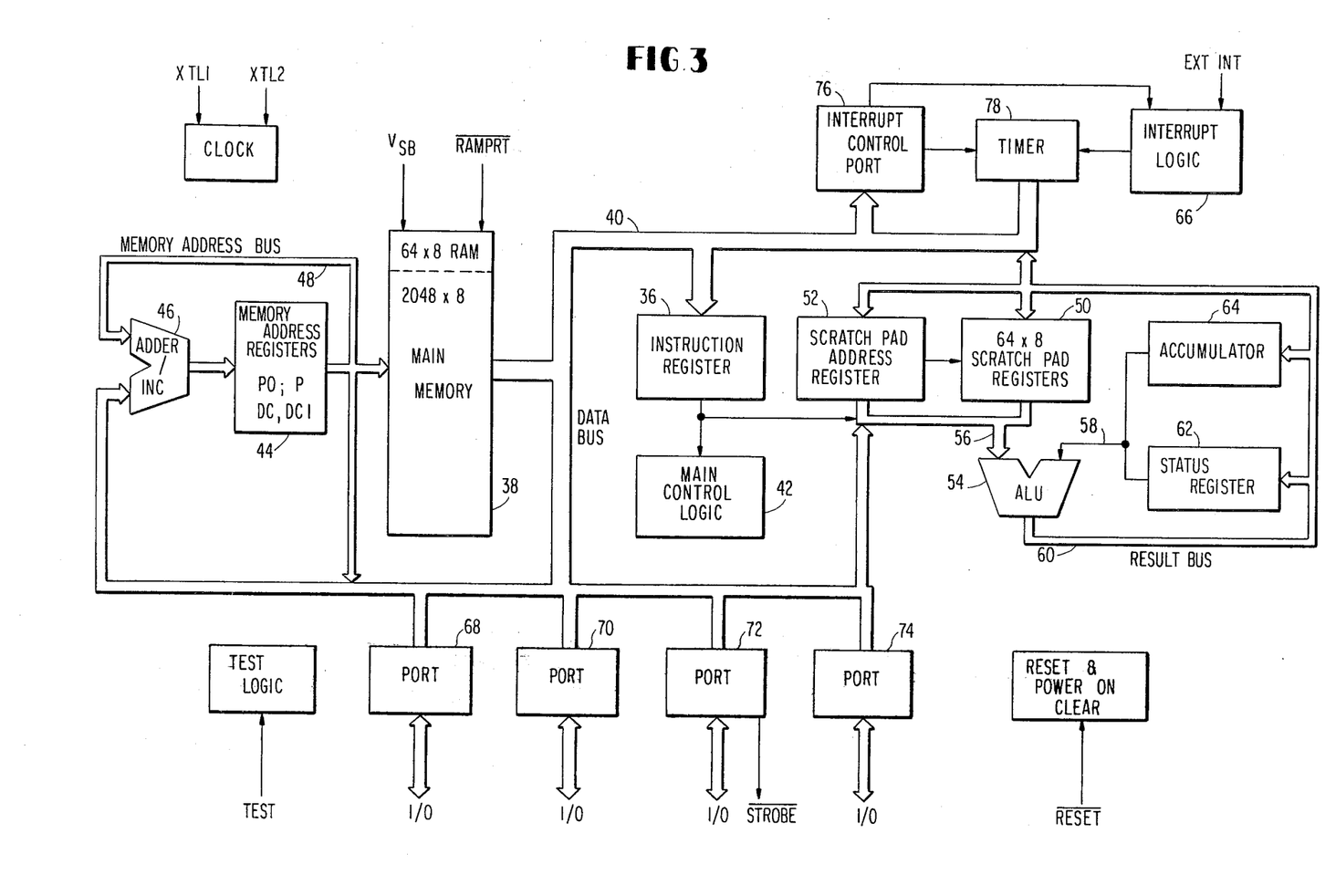
FIG. 3 is a generalized block diagram of a microcomputer used in the digital control system of the subject invention.

The functional organization of the single-chip microcomputer 3870 is shown in FIG. 3. The instruction register 36 receives the operation code of the instruction to be executed from the program read only memory (ROM) 38 via the data bus 40. The main control logic 42 decodes the instruction and provides the necessary control and gating signals to all microcomputer circuit elements in order to execute the instruction. Associated with the read only memory 38 are four 11 bit registers indicated by a single block 44 in the figure. These are the program counter, the stack register, the data counter and the auxiliary data counter. The program counter is used to address instructions or immediate operands. The stack register is used to save the contents of the program counter during an interrupt or subroutine call. In other words, the stack register contains the return address at which processing is to resume upon completion of the subroutine or the interrupt routine. The data counter is used to address data tables in the read only memory 38. This register is auto-incrementing. Of the two data counters, only the first can access the read only memory although an instruction allows the data counter and the auxiliary data counter to be interchanged. Associated with the address registers is an 11 bit adder/incrementer 46. This logic element is used to increment the program counter or the data counter when required and is also used to add displacements to the program counter on relative branches or to add the data bus contents to the data counter. The microcomputer program and data constants are stored in the read only memory 38. When a read only memory access is required, the appropriate address register, i.e., the program counter or the data counter, is gated onto the read only memory address bus 48 and the read only memory output is gated onto the main data bus 40.

The scratchpad registers 50 may be used as a general purpose random access memory (RAM). The indirect scratchpad address register 52 is a 6 bit register used to address the sixty-four scratchpad registers 50, and all sixty-four of these registers may be accessed using the indirect scratchpad address register. In addition, the lower 12 registers may also be directly addressed. The indirect scratchpad address register may be visualized as holding two octal digits. The significance of this is that a number of instructions increment or decrement the least significant 3 bits or the most significant 3 bits when referencing scratchpad bytes via the indirect scratchpad address register.

After receiving commands from the main control logic 42 the arithmetic and logic unit (ALU) 54 performs the required arithmetic, logic or input/output operations using the data presented on the two input buses 56 and 58 and provides the result on the result bus 60. The arithmetic operations that can be performed in the arithmetic and logic unit are add, decimal adjust, add with carry, decrement, and increment. The logic operations that can be performed are AND, OR, Exclusive OR, 1's complement, shift right, and shift left. Besides providing the result on the result bus 60, the arithmetic and logic unit 54 also provides four signals representing the status of the result. These signals or flags are stored in the status register 62 and represent carry, overflow, sign and zero condition of the result of the operation. In addition to these four flags, the status register also holds a fifth status flag which is the interrupt control bit that can be used to enable or disable interrupt requests to the microcomputer. The accumulator 64 is the principal register for data manipulation with the microcomputer. The accumulator 64 serves as one input to the arithmetic and logic unit 54 for arithmetic and logical operations. No interrupts are acknowledged if the interrupt control bit is false. If the interrupt control bit is true and the program has enabled either the external interrupt or the timer interrupt or both, an interrupt when requested will be acknowledged and processed.

There are four bidirectional ports 68, 70, 72 and 74. In addition, the interrupt control port 76 and the timer 78 are addressed as separate ports. An output instruction causes the contents of the accumulator 64 to be latched into the addressed port, and an input instruction transfers the contents of the port to the accumulator 64.

The timer 78 is an 8 bit binary down counter which is software programmable to operate in one of three modes: the interval timer mode, the pulse width measurement mode, or the event counter mode. The timer 78 includes a programmable prescaler and an 8 bit modulo-N counter. The desired timer mode, prescale value, starting and stopping the timer, active level of the external interrupt pin, and local enabling and disabling of interrupts are selected by outputting the proper bit configuration from the accumulator 64 to the interrupt control port 76. The rate at which the timer 78 is clocked in the interval timer mode is determined by the frequency of an internal clock and by the division value selected for the prescaler. The prescaler is used to clock the 8 bit down counter in the interval timer mode. The modulo-N counter is a buffer whose function is to save the value which was most recently outputted by the timer.

With the timer 78 in the interval timer mode, the external interrupt pin is available for non-timer related interrupts. When enabled, an external interrupt request latch is set when there is a transition from the inactive level to the active level. If there is both a timer interrupt request and an external interrupt request, the timer interrupt is handled first.

When power is first applied to the microcomputer, the reset input goes low and initialization occurs. The program counter and the interrupt control bit of the status register are cleared. Ports 72, 74 and 76 and timer 78 are loaded with 0's.

Figure 4:
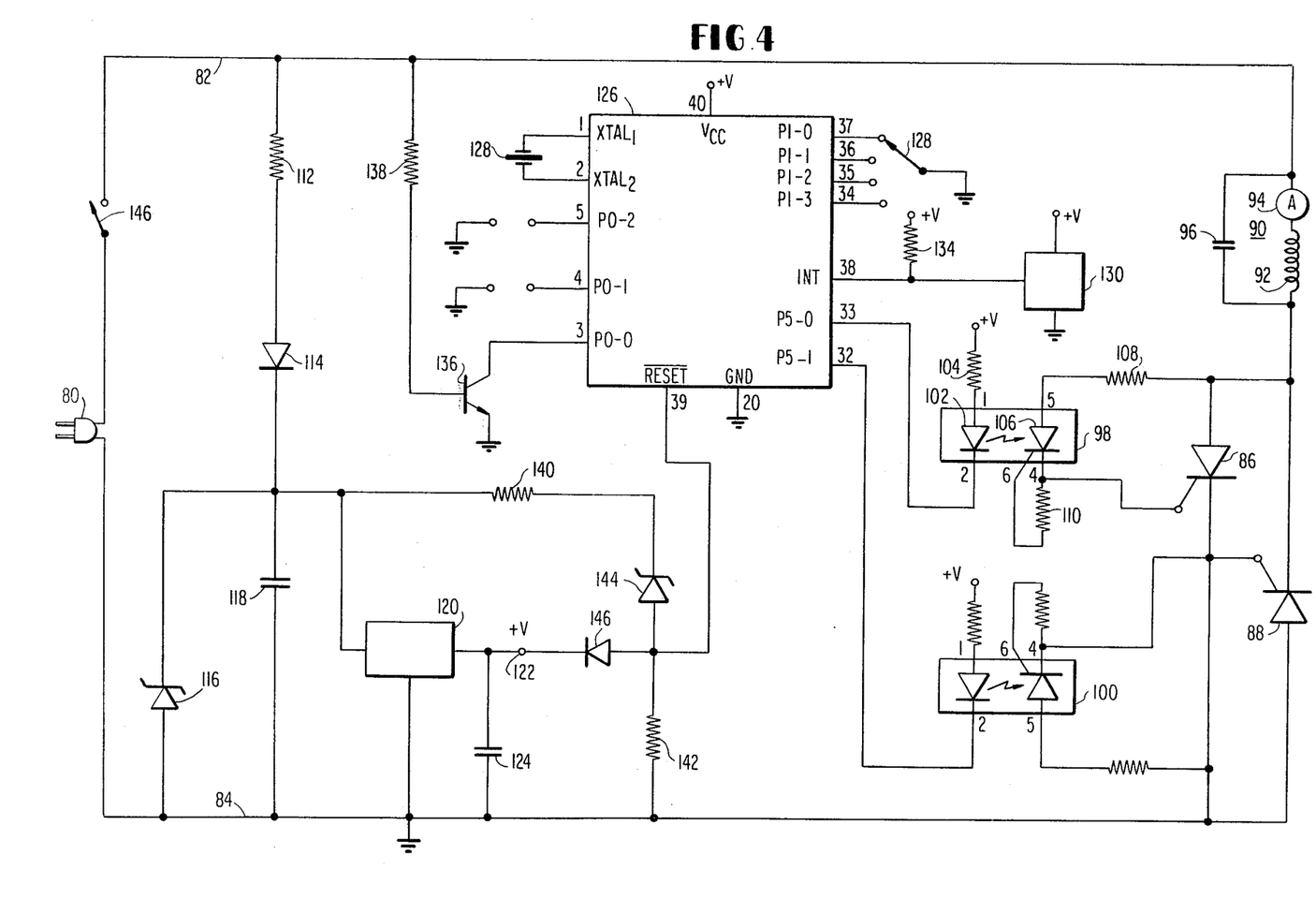
FIG. 4 is a block and schematic diagram of the digital control system of the invention.

Referring now to FIG. 4, a power plug 80 is adapted to be plugged into an AC outlet and is provided with powerlines 82 and 84. Power line 84 is connected to the cathode of SCR 86 and to the anode of SCR 88. The anode of SCR 86 is connected in common with the cathode of SCR 88 to motor 90. Motor 90 is a universal electric motor comprising a field 92 connected in series with an armature 94 and having a switching noise suppression capacitor 96 connected in parallel with the series connection of field 92 and armature 94. The common junction of armature 94 and capacitor 96 is connected to powerline 82.

A gate control circuit 98 supplies gating pulses to SCR 86, while a gate control circuit 100 supplies gating pulses to the gate of SCR 88. Gate control circuits 98 and 100 are identical and, therefore, only the details of gate control circuit 98 will be described. This circuit comprises an opto-coupler. The opto-coupler package includes a light emitting diode (LED) 102 having its anode connected through resistor 104 to a source of regulated positive voltage +V. In the same package with LED 102 is an SCR 106 with a photosensitive gate having its anode connected through resistor 108 to the anode of SCR 86 and its cathode connected directly to the gate electrode of SCR 86. The gate and cathode of SCR 106 are connected together by resistor 110 to provide a bias level to the gate of that SCR. In operation, when LED 102 is biased to conduction, SCR 106 conducts to provide a gating signal to SCR 86 causing that SCR to conduct supplying current to motor 90. In a similar manner, SCR 88 is caused to conduct to supply current to motor 90 in alternate half cycles of the AC power by gate control circuit 100.

The DC power supply which develops the supply voltage for the various circuits used in FIG. 4 comprises a resistor 112, a rectifier diode 114 and a filter capacitor 116 connected in series from powerline 82 to powerline 84. A Zener diode 118 is connected in parallel with capacitor 116, and a series voltage regulator 120 is connected to the common junction of diode 114 and capacitor 116 and provides a regulated output at terminal 122 indicated as +V. Voltage regulator 120 may be, for example, a type MC78MO5C regulator manufactured by Motorola Semiconductor Products, Inc. A further filter capacitor 124 is connected across the output of regulator 120.

The heart of the system shown in FIG. 4 is a microcomputer 126 which was described with reference to FIG. 3. This computer is fabricated as an integrated circuit having a total of 40 pin connectors. Pins 3–6 and 16–19 comprise the 8-bit port 68, pins 34–37 and 22–25 comprise the 8-bit port 70, pins 8–15 comprise the 8-bit port 72, and pins 26–33 comprise the 8-bit port 74. Pins 1 and 2 are connected to an external crystal 128 which supplies a timing reference. The regulated +V from the power supply terminal 122 is connected to pin 40 while pin 20 is connected to system common. In the embodiment shown in FIG. 4, rotary switch 128 which is operated by selector dial 18 shown in FIGS. 1 and 2 is connected to pins 34–37 of port 70.

Pin 32 of port 74 is connected to the cathode of the LED in switch control circuit 100, and pin 33 of port 74 is connected to the cathode of LED 102.

A Hall effect sensor 130 is connected to the interrupt input at pin 38 of microcomputer 126. A pull-up resistor 134 is connected between pin 38 and the regulated positive voltage +V, and the Hall effect sensor 130 is connected between the regulated positive voltage +V and the system common. A Hall effect sensor is a commercially available item manufactured by Sprague with the designation UGN 3013. The Hall effect sensor 130 produces an output when magnet 28 shown in FIG. 1 passes in proximity to the Hall effect sensor. When a pulse is applied to the interrupt pin 38, an external interrupt is acknowledged. The external interrupt service routine stops the internal timer, records its value and restarts the timer. This measures the time elapsed since the previous external interrupt, which is the time during which the shaft completed one revolution.

AC powerline zero crossing information is generated by a transistor 136 having its emitter connected to system common and its collector connected to pin 3 of microcomputer 126. The base of transistor 136 is connected via resistor 138 to powerline 82.

Power on reset is provided to reset pin 39 by the circuit comprising resistors 140 and 142, Zener diode 144 and diode 146. Resistor 140 is connected between the junction of diode 114 and capacitor 116 and the cathode of Zener diode 144. Resistor 142 is connected between the anode of Zener diode 144 and powerline 84. The cathode of diode 146 is connected to terminal 122 while the anode of diode 146 is connected to the junction of Zener diode 144 and resistor 142 and also to reset pin 39. The effect of this circuit is to apply a low value to the reset pin when power is first supplied to the powerlines 82 and 84. After a short period, a high value is clamped to the reset pin 30.

In order to operate the hand-held power drill, the power cord must be plugged into a source of AC voltage by means of plug 80, a speed selected by means of rotary switch 128, and switch 146 must be closed. Switch 146 is actuated by the trigger 22 shown in FIG. 1.

Figure 5:
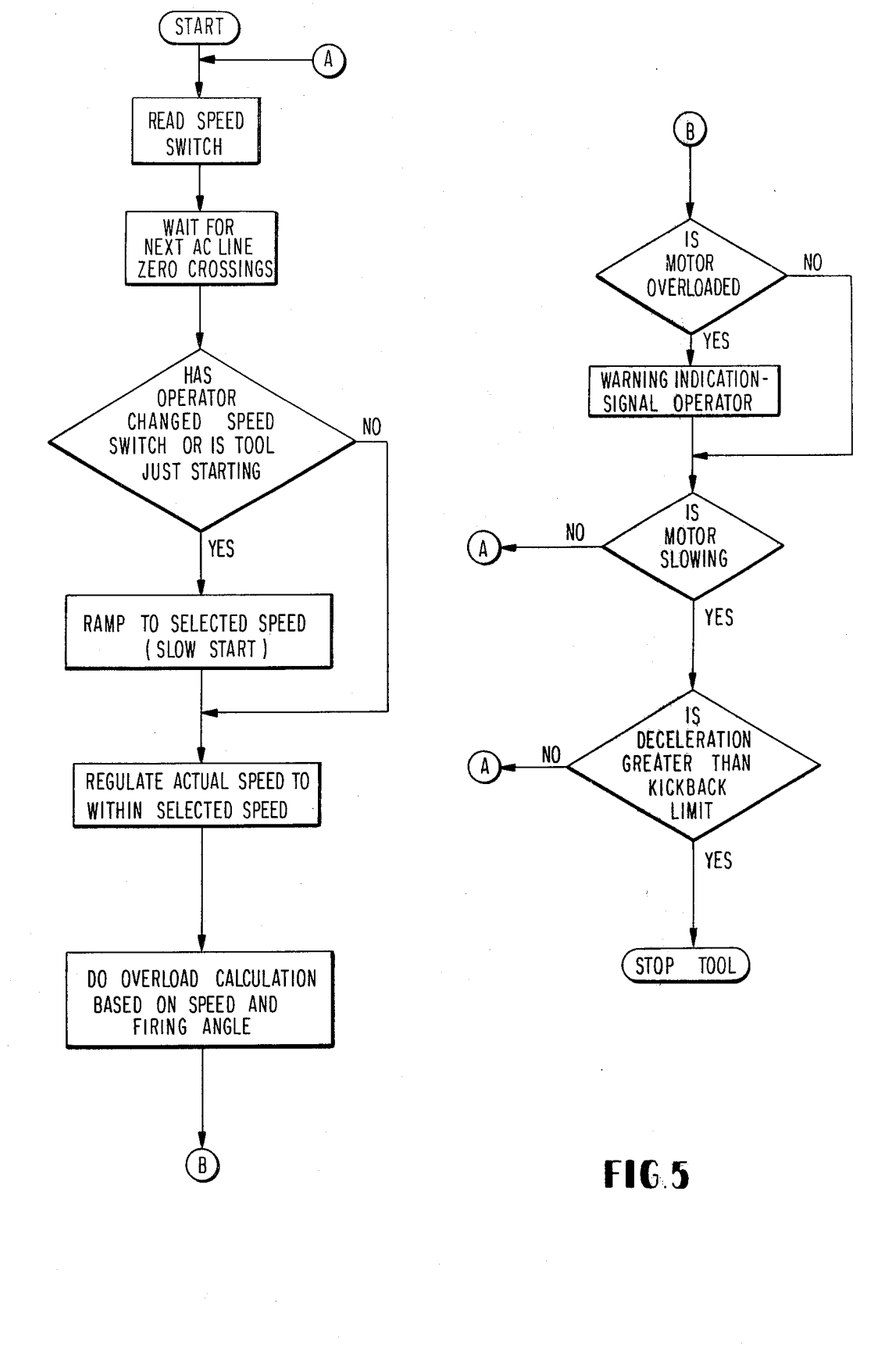
FIG. 5 is a simplified flow diagram of the main line program for the microcomputer.

The simplified flow diagram of the microcomputer main program is shown in FIG. 5. Assuming, first of all, that the power cord of the power tool has been plugged into an AC outlet, a speed has been selected and the trigger is pulled on, the first step in the flow diagram is to read the speed switch 128. The microcomputer then determines whether the operator has changed the speed or the motor is just starting. If either of these conditions is determined to exist, then the microcomputer ramps the motor speed to the selected speed. This is accomplished with a slow start routine, but basically what microcomputer 126 does is to incrementally increase the length of time per AC half cycle during which current is supplied to the motor until the selected speed has been reached.

After the selected speed has been attained, the speed of the motor under load is maintained at the selected speed. This is accomplished with another routine. This routine is basically a digital feedback speed control of the electric motor 90 which compares the actual speed with the selected speed to generate an error quantity which is used to alter the time per AC half cycle during which current is supplied to the motor via SCRs 86 and 88. The actual speed is computed when the magnet 28 passes by the Hall effect sensor 30 which creates a pulse at the external interrupt input. The external interrupt is acknowledged and elapsed time is measured as described hereinbefore, this time being inversely proportional to the speed of motor 90.

Next, the overload calculation is performed. This calculation determines if an overload condition exists based on the measured speed of the motor 90 and the firing angles of the SCRs 86 and 88. If an overload condition is detected, the motor speed is decreased to a very low and poorly controlled speed until a normal operating temperature is reached. This serves as a warning indication to the operator.

With additional reference to FIG. 6, the manner in which the overload calculation is performed will now be explained. Some prior art attempts to provide a power tool with overload protection involve the use of a temperature sensing device which senses when the temperature of the motor reaches a critical level. The reason for not following this approach in the present invention is the incremental cost and complexity involved in adding a temperature sensor, such as a thermistor, to the unit. Instead, the present invention proceeds on the premise that the temperature of the motor can be inferred from information already available to the microcomputer; i.e., the speed of the motor and the voltage applied to the motor. More specifically, the factors which control the temperature of the motor are the current drawn by the motor and the means provided for dissipating the heat generated by the motor. As with most power tools, the cooling fan is driven directly off the armature of the motor. Accordingly, the cooling effect contributed by the fan can be determined directly from the measured speed of the motor. In addition, the current drawn by the motor can be determined from the speed of the motor and the conduction angle of the SCRs 86 and 88. Thus, it can be seen that the information necessary to infer the operating temperature of the motor is already available to the microcomputer.

In view of the known relationship between current and temperature, many prior art motor control circuits simply establish a maximum current level for determining an overload condition. The disadvantage with this approach, however, is that it fails to recognize that it is not solely the instantaneous current draw of the motor which determines whether or not it will overload. Not only are the effects of cooling not accounted for in this approach, but also there is no recognition of the time factor involved. Cooling effects momentarily aside, a change in current does not immediately invoke a corresponding change in motor temperature. Rather, the temperature of the motor will at any given point in time, depend on the amount of current being drawn and the period over which such current has been drawn. In other words, temperature is governed not only by present operating conditions but past operating conditions as well. Thus, for example, a motor can safely be operated at current levels which will ultimately cause an overload condition as long as the period of operation at such levels is limited accordingly. Moreover, the period of safe operation will vary inversely with the magnitude of the current drawn by the motor and directly with the speed of the motor, where a cooling fan is driven off the motor armature.

Accordingly, it is highly desirable for the control circuit to provide an overload protection scheme that is sophisticated enough to accurately distinguish between safe operating conditions and the imminent occurrence of a potentially damaging overload condition. The present invention accomplishes this by utilizing what in effect is a numerical integrator. In particular, sixty times each second an empirically determined "heating value" is added to, or substracted from, the contents of a 16-bit register. The selection of the particular "heating value" is based upon the operating speed of the motor as measured by the speed sensor 30 and the conduction angle of the SCRs 86 and 88. If the total in the register ever exceeds a predetermined limit, an overload condition is signalled. Normal operation is resumed when the total in the register drops below a second lower predetermined limit. A minor negative heating effect is assumed when the motor is not running.

Figure 6:
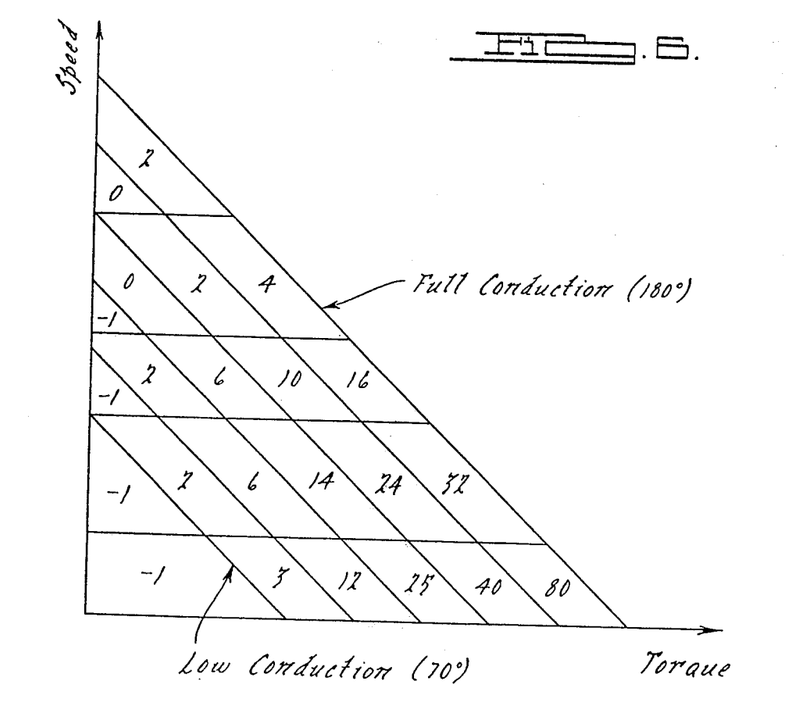
FIG. 6 is a graph of the speed vs. torque curves for the drill motor illustrating the "heating values" assigned to the various operating ranges of the motor.

In FIG. 6, the speed vs. torque curves for the motor at various conduction angles are shown. The uppermost diagonal line represents full conduction (180°) while the lowermost diagonal line represents a low conduction angle (70°). The area under the curves is divided further into five speed ranges, thereby creating a matrix. Each region in the matrix is assigned a "heating value", which is either a positive value or a negative value depending upon whether the motor experiences a net increase or decrease in temperature when operated in that region. Thus, it will be appreciated that the assigned heating values in the matrix take into account not only the degree of heat generated by the motor, but also the cooling effect caused by the airflow from the fan coupled to the motor armature. The magnitude of the number assigned to each region is determined empirically based upon the following three factors: (1) the net heating effect on the motor when continuously operated in that particular region, (2) the predetermined overload limit selected for the register, and (3) the frequency at which the contents of the register are updated. For example, in the preferred embodiment, if the motor is continuously operated in a region having a heating value of 25, an overload signal will be generated in approximately 24 seconds. Similarly, if the motor is continuously operated in a region having a heating value of 10, an overload signal will be produced after approximately one minute.

The matrix of heating values shown in FIG. 6 is stored in the microcomputer 126. Sixty times each second, the microcomputer is programmed to "look-up" the appropriate heating value, based upon the present conduction angle of the SCRs 86 and 88 and the measured speed of the motor, and add (subtract) the value to the contents of a 16-bit register. In the preferred embodiment, an overload condition is signalled whenever the contents of the register equal the binary equivalent of 36,096. Resumption of normal operation occurs when the contents of the register drop below the binary equivalent of 18,175.

Returning to FIG. 5, the next operation performed by the microcomputer is to calculate the change in successive speed readings to determine if the motor is slowing. If not, the program returns to the step of reading the speed switch and continues from there. If on the other hand it is determined that the motor is slowing, then it is necessary to determine if an impending kickback condition exists. As previously explained, the motor speed is inferred from time measurements, and so a deceleration will be found to exist when the most recent time measurement (NSR) is greater than the next most recent time measurement (OSR). The difference between these readings is a measure of the deceleration of the motor. It has been determined that when a kickback condition exists, the deceleration of the tool and hence the motor is quite large. Therefore, it is possible to establish a kickback limit against which the difference between NSR and OSR is measured. If this difference exceeds the limit, a kickback has been detected. This limit is a function of selected speed, as for example, a 20% change in speed within an 8.3 msec. period.

If a kickback condition is detected, the power tool is stopped. As previously explained, the microcomputer accomplishes this by ceasing to provide gate pulses to gate control circuits 98 and 100 thereby effectively blocking power to the motor 90. If on the other hand it is determined that a kickback condition does not exist, e.g., the difference between NSR and OSR is less than the kickback limit, then the program returns to the step of reading the speed switch and continues from there.

It will be understood that various changes in the details, materials, arrangement of parts and operating conditions which have been herein described and illustrated in order to explain the nature of the invention may be made by those skilled in the art within the principles and scope of the invention.

What is claimed is:

1. The method of monitoring the operating temperature of a motor including the steps of:
   storing a matrix of heating values representing the relative heating condition of the motor when operated at various speeds and loading conditions with one heating value being assigned to each designated operating region of the motor, periodically determining in which of the designated operating regions the motor is currently operating based upon the speed of the motor and the voltage applied to the motor and adding the corresponding heating value assigned to that region to an accumulated total, and
   determining whenever the accumulated total exceeds a predetermined amount.

2. A control circuit for monitoring the operating temperature of an electric motor, comprising:
   a speed sensor for sensing the speed of the motor and producing a corresponding speed signal,
   first digital storage means for storing a plurality of heating values representing the relative steady-state heat generating condition of the motor when operated at various speeds and loading conditions,
   second digital storage means for storing an accumulated total of past heating values, and
   means for periodically selecting from said first digital storage means the appropriate heating value corresponding to the present operating condition of the motor as determined in accordance with said speed signal and the voltage being applied to the motor and adding said appropriate heating value to the accumlated total in said second digital storage means.

3. The control circuit of claim 2 further including means for determining whenever the accumulated total in said second digital storage means exceeds a predetermined amount.

4. The control circuit of claim 2 wherein said heating values are empirically derived.

5. In a power tool having an electric motor and means for applying power to the motor, a control circuit for monitoring the operating temperature of the motor comprising:
   a speed sensor for sensing the speed of the motor and producing a corresponding speed signal; and
   microcomputer means for monitoring the temperature of the motor in accordance with information derived from said speed signal and the power applied to the motor including first memory means for storing a plurality of heating values representing the relative steady-state heat generating condition of the motor when operated in a corresponding plurality of designated regions each defined by a predetermined range of speed and torque values, storage means for storing an accumulated total of past heating values, and processor means for periodically determining from said speed signal and the power applied to the motor the designated region within which the motor is operating, selecting in accordance therewith the corresponding heating value stored in said first memory means, and adding said heating value to the contents of said storage means.

6. The control circuit of claim 5 wherein said processor means is programmed to determined the level of power applied to the motor in accordance with the firing angle of a semiconductor control device connected to the motor.

7. A method of monitoring the temperature of a motor including the steps of:
   determining the cooling effect of the motor in terms of its speed,
   determining the heating effect of the motor in terms of applied power,
   determining a heating value, which is a function of both the determined cooling effect and the determined heating effect, from a set of heating values established over a predetermined motor operating range,
   adding the heating value periodically to an accumulated total of past heating values, and
   signalling the occurrence of the accumulated total exceeding a predetermined amount.

* * * * *